Patented June 23, 1936

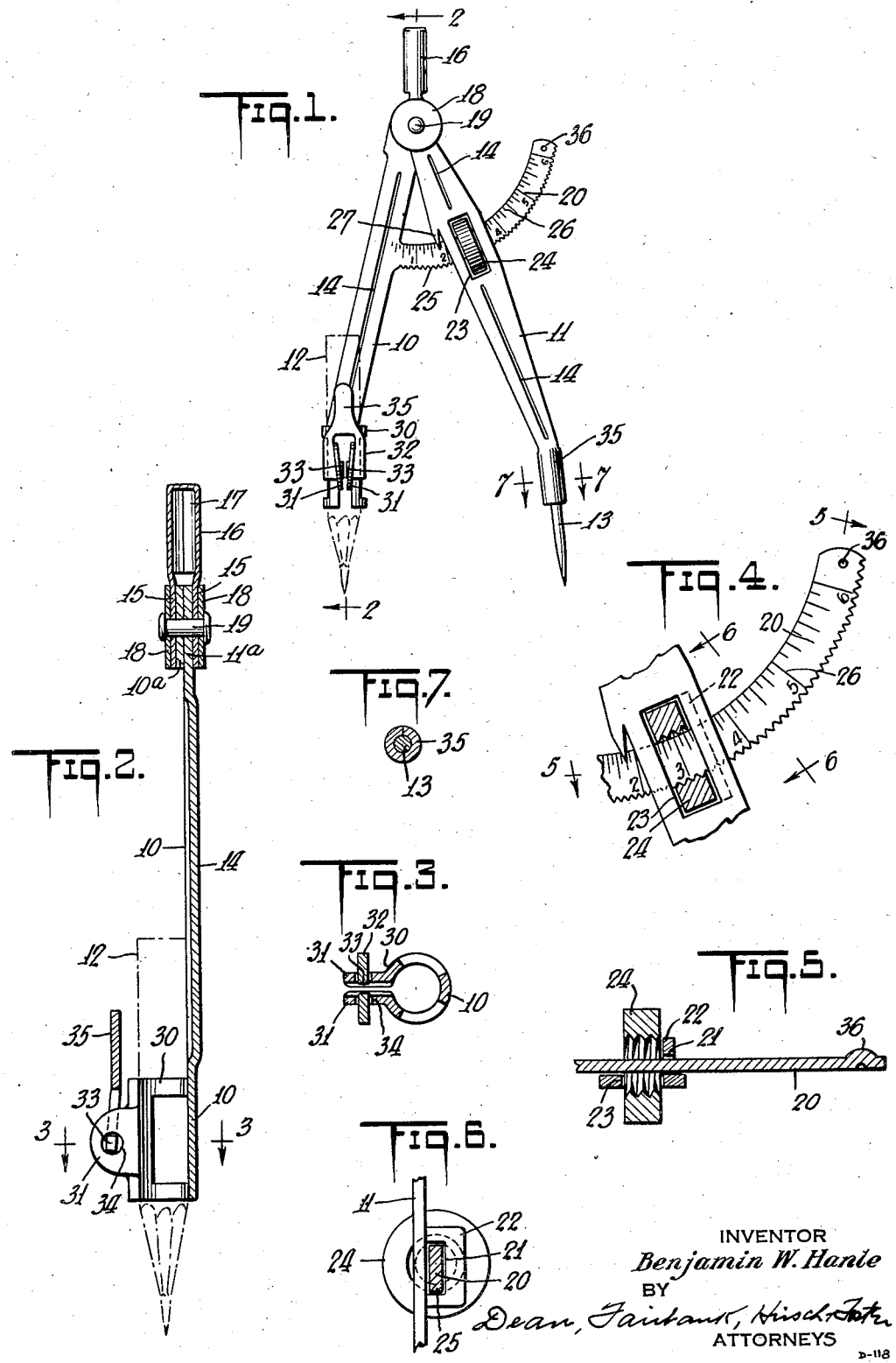

2,045,298

UNITED STATES PATENT OFFICE 2,045,298

DRAFTING COMPASS

Benjamin W. Hanle, Elizabeth, N. J., assignor to Eagle Pencil Company, New York, N. Y., a corporation of Delaware Application October 6, 1932, Serial No. 636,508

6 Claims. (Cl. 33—155)

My present invention while capable of embodiment in an extremely accurate draftsman's compass is more particularly concerned with the provision of an inexpensive compass adapted to be used by school children.

One object of the invention is to provide a device of this character affording a visual indication of the distance between the compass feet i. e. the radius of the circle to be drawn and to provide means for conveniently effecting relative adjustment of the compass legs even through very small distances.

Another object is to provide a reasonably accurate device of this character the adjustment of which may be accomplished in simple manner and without the need for skillful handling.

Another object is to provide an instrument of this type formed principally from a few simple stampings, the need for machine work being practically eliminated and the assembly of the parts being expeditiously effected.

Another object is to provide a tool which despite its simplicity and its relatively inexpensive construction will be rugged and durable in use and capable of convenient and expeditious manipulation.

Still another object is to provide a simple type of holder for the marking element of the compass, the holder being characterized by the ease and facility with which it may be contracted or expanded for gripping or releasing a pencil.

In accordance with a preferred embodiment of the invention each compass leg is in the form of a flat stamping. Substantial frictional resistance opposes relative pivotal movement of the legs and hold them in any desired position of adjustment.

One compass leg carries a laterally extending arcuate rack graduated to afford a scale and guided by means associated with the other compass leg such as a struck out retainer piece. The rack is encircled by an internally threaded nut accommodated in an opening in the rack guiding leg. The nut is restrained against substantial movement with the rack by the walls of said opening. It meshes loosely with the rack teeth so that by rotating the nut, relative advance or separation of the two compass legs may be effected. A pointer carried by the nut-retaining leg coacts with the scale of the rack to indicate the radius of the circle for which the compass is set. The nut may fit fairly loosely since it is never called upon to oppose relative movement of the legs, the friction at the pivot being sufficient to prevent such movement except when reduced by the relatively powerful screw action of the nut and rack.

The invention may be more fully understood from the following description in connection with the accompanying drawing wherein:—

Fig. 1 is a side elevational view of a compass embodying my invention, the removable marking implement being shown in dotted lines, Fig. 2 is an enlarged vertical sectional detail taken on the staggered line 2—2 of Fig. 1, Fig. 3 is a transverse sectional view through the pencil clamping sleeve taken on the line 3—3 of Fig. 2, Fig. 4 is an enlarged detail of the graduated arcuate arm and its associated nut with the nut in section for the sake of clearness and with closely associated parts of the compass leg in elevation, Fig. 5 is a longitudinal sectional view on the line 5—5 of Fig. 4, Fig. 6 is a transverse sectional detail on the line 6—6 of Fig. 4, and Fig. 7 is a sectional detail on the line 7—7 of Fig. 1.

In the drawing the two compass legs have been designated at 10 and 11, leg 10 being adapted to carry the pencil or other marking implement illustrated in dotted lines 12 and leg 11 mounting the pointed paper impaling foot 13. These legs are stamped from flat metal stock and provided with longitudinal corrugations indicated at 14 to strengthen them against transverse bending.

The pivoted ends of the legs terminate in flat circular portions 10a and 11a having registering central apertures therein. The circular ends of the legs lie between the circular extensions 15, formed at the end of a handle member 16, the latter being preferably of a single piece of metal bent into generally U shape and with parts of the legs of the U folded inwardly as at 17 to form a substantially cylindrical finger grip portion. Outside of the circular ends 15 of the handle 16 are a pair of circular friction disks 18 which like the handle ends 15 have central apertures therein registering with the apertures of the leg ends 10a and 11a.

A rivet 19 passed through all of these apertures and turned over with a predetermined pressure creates a substantial friction between the ends of the compass legs and the members which they contact as well as between the extensions of the handle and the members which they contact whereby a stiff frictional resistance opposes relative pivotal movement of the legs with respect to each other and relative pivotal movement of the handle with respect to the legs.

Preferably stamped integrally with the leg 10 is a laterally extending arcuate metal arm or rack 20 which passes through an opening 21 in an ear 22 struck rearwardly from the arm 11. This outstruck ear affords an opening 23 in the arm 11 sufficiently large to accommodate a nut 24 which encircles the arm 20 and meshes with teeth 25 formed on the lower edge thereof. The rack 20 (typically the upper edge thereof) is provided with scale graduations indicated at 26 and the compass leg 11 is provided with an integral finger portion 27 adapted to read upon the scale.

A portion of the nut 24 always projects forwardly through the opening 23 due to the fact that the ear 22 locks the nut carrying rack 20 against any substantial movement in a plane at right angles to the plane in the compass leg 11. The nut may be comparatively loose, no extremely accurate meshing of the nut with the rack or extremely careful fit between the nut and the opening 23 or between the rack and the opening 21 being necessary. When the nut 24 is rotated it reacts against the walls of opening 23 and acts through gear teeth 25 to cause the compass leg 11 to be shifted along the rack 20. By noting the reading of the pointer 27 upon the scale 26 the compass may be readily set for drawing an arc or circle of any predetermined radius.

I have provided a highly efficient and extremely simple type of holder for the removable marking implement 12, this holder being for the most part integral with compass leg 10. It consists of a split skeleton sleeve member 30 bent forwardly from the compass leg and integral therewith and terminating in a pair of ears 31 both of which are apertured and both of which are set at an angle to the vertical axis of the sleeve, that is to say, these vertical ears converge toward their lower ends and diverge toward their upper ends. The ears serve as cam members and cooperate with a suitable contracting and locking means to effect contraction or expansion of the sleeve and the gripping or release of the pencil 12.

The clamping means in the present instance consists of a generally U shaped metal stamping having legs 32 which embrace the ears 31 and are provided at their free ends with inwardly turned extensions 33 entering apertures 34 in the ears. The inner faces of the legs 32 converge toward their free ends, that is to say, toward the extensions 33 and at their upper ends the legs are integrally united to a handle extension 35.

It will be seen that if the locking device is swung downwardly from the position of Fig. 1, the inner faces of the legs 32 will slide over the inclined ears 33 permitting progressive separation of these ears and expansion of the sleeve. When the locking member is swung in the opposite position, it acts to wedge the ears together and contract the sleeve sufficiently to grip a pencil within it. No especially accurate fit of the extensions 33 in the openings 34 is necessary it being in fact preferable that this fit be somewhat loose in order that pencils of slightly different size may be conveniently clamped.

The lower end of the leg 11 is bent to afford the sleeve member 35 which tightly grips the impaling pin 13. In use the compass legs are first set at a zero rating on the scales by manipulating the nut 24 and the end of the marking device 12 registered accurately with the end of the paper impaling pin 13. The nut 24 is then adjusted until the pointer 27 indicates the desired radius on the scale. Thereupon the compass may be manipulated in the usual manner by using the handle 16. This handle may be swung at various angles to permit convenient manipulation of the instrument.

Due to the friction imposed at the compass leg pivot the relatively loose fitting nut 24 is not under any strain when the compass is in use. In other words, this nut is merely used to set the compass and the strain of holding it in a given setting is entirely upon the friction clutch construction at the pivot of the legs.

In order to prevent inadvertent disassembly of the parts the free end of the arcuate arm 25 is formed with an outstruck tit 36 adapted to engage the ear 22 and limit the relative expansion of the compass legs. This tit or projection is formed after assembly has been completed.

While the implement is referred to in the specification and claims as a compass it is understood that this term is intended to include all analogous devices such for instance as dividers.

It will thus be seen that there is herein described a device in which the several features of this invention are embodied, and which in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A compass of the character described including a pair of legs pivotally connected together at one end, one leg carrying a marking implement at its free end and the other leg affording means to penetrate the article to be marked, an arcuate rack extending laterally from one leg about the pivot point of the legs as a center, guide means on the other leg interlocked with said rack, a nut encircling the arm meshing with the rack teeth and restrained against lateral movement with the arm by the guide carrying leg, said guide means comprising an apertured ear struck out from the guide carrying leg, said nut including a portion accommodated in the opening formed by striking out said ear.

2. A compass of the character described including a pair of legs pivotally connected together at one end, one leg carrying a marking implement at its free end and the other leg affording means to penetrate the article to be marked, an arcuate rack extending laterally from one leg about the pivot point of the legs as a center, guide means on the other leg interlocked with said arm, a nut encircling the arm meshing with the rack teeth and restrained against lateral movement with the arm by the guide carrying leg, said guide means comprising an apertured ear struck out from the guide carrying leg, said arm at its free end including an integral projection engageable with the guide to limit relative separation of the free ends of the legs.

3. A compass including legs formed of substantially flat stampings and each including a circular portion at one end, said portions overlying each other and pivotally connected together, each leg at its free end being formed with a sleeve portion, a paper penetrating pin secured in one sleeve, means to contract and expand the other sleeve and thereby grip or release a marking implement, an arcuate rack carried by one leg and a nut associated with the other leg and meshing with said rack to effect relative separation or advance of the free ends of said legs, the leg with which said nut is associated having an opening formed therein by bending out part of the metal of said leg, said nut being partially accommodated in said opening and said bent out material serving as a guide for the arcuate rack.

4. As a new element in a compass, a pencil carrying leg including a flat stamping having one end bent to form a split sleeve, apertured ears integral with and extending from adjacent the edges of the split sleeve and oppositely inclined with respect to the longitudinal axis of the sleeve and a pivoted camming device engaged in the apertures of said ears and operating by the camming effect on the ears to expand or contract the sleeve.

5. As a new element in a compass, a pencil carrying leg including a flat stamping having one end bent to form a split sleeve, apertured ears integral with and extending from adjacent the edges of the split sleeve and oppositely inclined with respect to the longitudinal axis of the sleeve and a pivoted camming device engaged in the apertures of said ears and operating by the camming effect on the ears to expand or contract the sleeve, said camming device being forked to provide legs embracing the ears, inwardly turned portions at the free ends of the legs entering the apertures of the ears and the inner faces of the legs being inclined for camming action on the ears.

6. A compass including a marker carrying leg and an impaling device carrying leg pivotally connected together, the marker carrying leg including an integral laterally extending arcuate arm having a toothed edge, the other leg having an opening therein, a nut loosely fitting within said opening encircling the arm and meshing with the teeth thereof, the leg with the opening including an integral guide portion for said arm struck out from the leg to form said opening and means exerting sufficient friction at the pivot point of the legs to hold the legs in any position of relative adjustment independently of the nut.

BENJAMIN W. HANLE.